(12) United States Patent
Tan et al.

(10) Patent No.: US 7,584,237 B1
(45) Date of Patent: Sep. 1, 2009

(54) FAST HARDWARE DIVIDER

(75) Inventors: Teik-Chung Tan, Austin, TX (US);
Michael Tuuk, Round Rock, TX (US);
Wing-Shek Wong, Austin, TX (US)

(73) Assignee: Advanced Micro Devices, Inc.,
Sunnyvale, CA (US)

( * ) Notice: Subject to any disclaimer, the term of this patent is extended or adjusted under 35 U.S.C. 154(b) by 760 days.

(21) Appl. No.: 11/247,628

(22) Filed: Oct. 11, 2005

(51) Int. Cl.
*G06F 7/52* (2006.01)
(52) U.S. Cl. .................................. 708/650
(58) Field of Classification Search .......... 708/650, 708/504
See application file for complete search history.

(56) References Cited

U.S. PATENT DOCUMENTS 5,272,660 A 12/1993 Rossbach
6,751,645 B1 * 6/2004 Gorshtein et al. ........... 708/650
7,127,483 B2 10/2006 Beaumont-Smith et al.

OTHER PUBLICATIONS

U.S. Appl. No. 11/175,089, filed Jul. 5, 2005.

Chiang, et al., "Carry-Free Radix-2 Substractive Division Algorithm and Implementation of the Divider", Department of Electrical Engineering, Tamkang Universtiy, Tamkange Journal of Science and Engineering, vol. 3, No. 4, pp. 249-255.

* cited by examiner

*Primary Examiner*—Tan V Mai
(74) *Attorney, Agent, or Firm*—Rory D. Rankin; Meyertons Hood Kivlin Kowert & Goetzel, P.C.

(57) ABSTRACT

A method and mechanism for performing division. A processor includes a divider configured to perform arithmetic division operations. Prior to dividing a dividend by a divisor, the divider manipulates the dividend and divisor to reduce the number of bits considered and the computations required to perform the division. The divisor is normalized by eliminating sign bits. The dividend is prescaled to eliminate one or more sign bits. Prescaling of the dividend may not be precise as sign bits of the dividend may be shifted out as groups of bits, rather than individual bits. Prescaling of the dividend may be adjusted to account for the fact that the divider considers multiple bits of the dividend at a time. Subsequent to prescaling and adjustment, the dividend may be adjusted in dependence upon the normalization of the divisor. Further adjustment may be utilized to maintain a significance relationship between the divisor and dividend. Subsequent to further adjustment, the division operation may be completed.

20 Claims, 9 Drawing Sheets

FAST HARDWARE DIVIDER

BACKGROUND

1. Field of the Invention

This invention relates to computer systems, and more particularly to arithmetic circuits in computer processors.

2. Description of the Related Art

In computing systems, processor performance may have a significant impact on the overall performance of the system. One important component of a processor's performance is the speed with which it performs arithmetic operations. If a processor exhibits poor arithmetic performance, then overall performance of the processor is likely to be relatively poor as well. While some arithmetic operations may be implemented in software or microcode, others may be implemented in hardware. Typically, arithmetic operations implemented in hardware are faster than those implemented in software or microcode.

One arithmetic operation which is often studied and sought to be improved is division. Frequently, integer divides are implemented by microcode routines using adds and shifts. However, such approaches generally require one clock cycle for every bit in the dividend. For example, in a standard divider, dividing a 128-bit dividend by a 64-bit divisor would require approximately 128 cycles in order to complete the divide. Even if the divider were configured to operate on n bits per cycle, the latency would still be approximately 128/n cycles—regardless of the value of the dividend. Consequently, such approaches tend to be relatively slow.

Accordingly, an efficient method and mechanism for performing division is desired.

SUMMARY

Methods and mechanisms for performing division in a processing unit are contemplated.

A method and mechanism are contemplated in which a divide operation includes prescaling the dividend and normalizing a divisor in order to eliminate examination of many or all sign bits. In this manner the latency of the divide operation may be reduced.

In one embodiment, prior to dividing a dividend by a divisor, a divider unit is configured to preprocess an original divisor and original dividend in order to reduce the number of bits considered during the division process. The original divisor is normalized by eliminating, or removing from consideration, sign bits. In addition, the original dividend is prescaled to eliminate from consideration one or more sign bits. Subsequent to normalizing the divisor and prescaling the dividend, the divider may complete the divide operation. With the removal from consideration of one or more bits, the number of computations required to perform the division operation may be reduced.

Also contemplated is a divider which is configured to consider more than one bit of the dividend at a time when performing a division operation. In such an embodiment, prescaling of the dividend may be adjusted to account for the fact that the divider considers multiple bits at a time. In one embodiment, subsequent to an initial prescaling, an adjustment may be made so that the adjusted dividend includes a number of bits which is a multiple of the number of bits considered by the divider at a given time. Subsequent to this adjustment, the dividend may be further adjusted in dependence upon the normalization of the divisor. Further adjustment may be utilized to maintain a significance relationship between the resulting divisor and dividend. Subsequent to further adjustment, the division operation may be completed.

Also contemplated is a divider which is configured to partition an original dividend into groups, and blocks, for purposes of examination. Smaller logic blocks may then concurrently examine portions of the original dividend for purposes of prescaling.

These and other embodiments, and aspects of the invention, may be obtained by reference to the following description and drawings.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
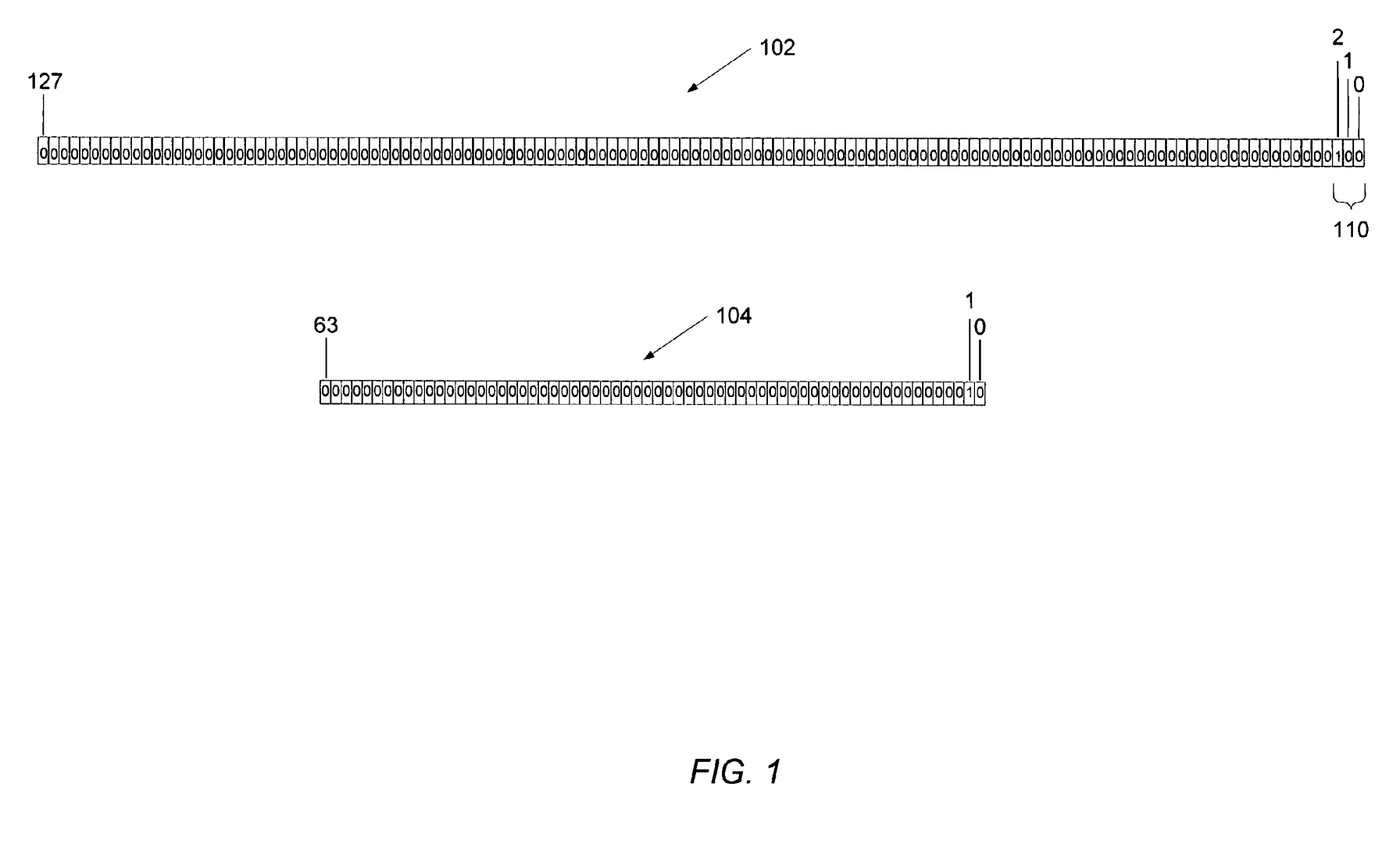
FIG. 1 depicts an example of a 64 bits divisor and a 128 bit dividend.

FIG. 1 provides an illustration depicting the inefficiencies which can exist in performing division in a processor. FIG. 1 shows a dividend 102 and divisor 104. In this example, the dividend 102 is 128 bits, and the divisor 104 is 64 bits. Each of the depicted dividend 102 and divisor 104 could represent the contents of particular registers. In the example shown, dividend 102 includes a binary representation of the decimal value 4, and divisor 104 includes a binary representation of the decimal value 2. In this embodiment, integers are signed with positive integers having a sign bit of "0" and negative integers having a sign bit of "1". Consequently, dividend 102 comprises a string of 125 zeroes followed by the three significant bits "100". Divisor 104 comprises a string of 62 zeroes followed by the two significant bits "10".

As discussed above, a typical division operation involves examining each bit of the dividend, generally proceeding from the most significant bits to the least significant bits. However, as can be seen, the 125 most significant bits of the dividend 102 are merely sign bits. Therefore, examining each of these sign bits not only consumes a significant amount of time, but such examination does not produce significant bits of the quotient. Only when the three significant bits 110 of the dividend 102 are reached, are meaningful quotient bits generated. Therefore, while it may only be necessary to examine the three bits 110 in order to produce the quotient, examination of all 128 bits may be performed. If examination and/or shifting of a bit generally corresponds to a single clock cycle, then 128 clock cycles are utilized for a computation which only requires 3 clock cycles. Alternatively, if a particular divider is configured to examine more than one bit at a time, such as three bits at a time, then 128/3, or 43 clock cycles will be spent on a task which should only require 3/3=1 clock cycle. Accordingly, an improved method and mechanism for performing division are desired.

Figure 2:
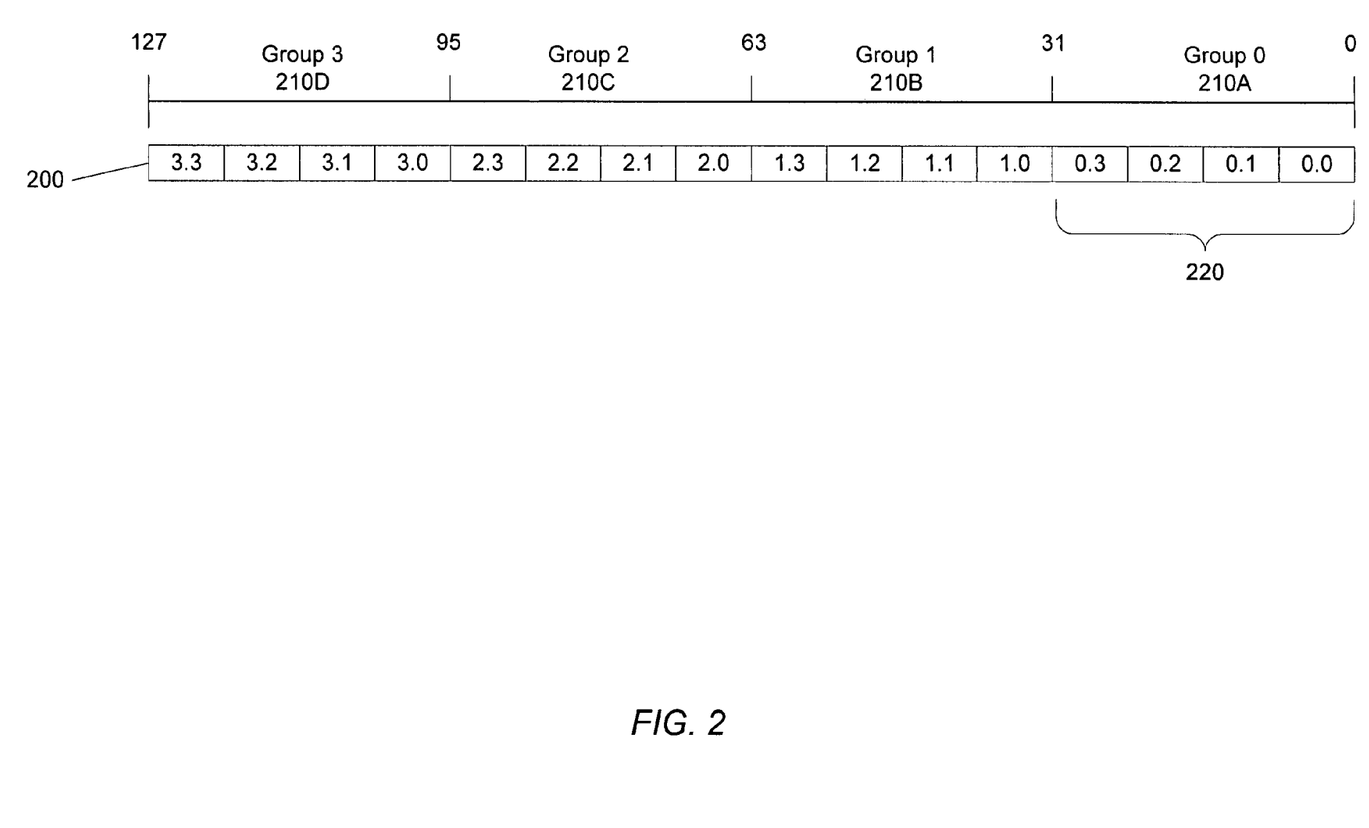
FIG. 2 illustrates one embodiment of a dividend partitioned into groups and blocks.

In one embodiment, a method and mechanism are contemplated in which each of a dividend and divisor are scaled and/or normalized in such a way that selected bits of the divisor and or dividend are removed from consideration during the division process and the speed with which divisions may be performed may be increased. FIG. 2 depicts one embodiment in which a 128 bit dividend 200 is partitioned into four groups 210A-210D. Each of the four groups 210 include 4 blocks (bytes in this example) of data. For purposes of discussion, each block is identified by its corresponding group number separated by the byte number within the group. So, for example, group 0 210A is shown to include four blocks 220. Within group 0 210, each of the blocks is identified by the group number "0.N", where N is the number of the block and is equal to 0-3.

In one embodiment, sign bits of the dividend 200 are identified by searching for a first bit transition beginning with the most significant bits. Identified sign bits are considered candidates for shifting out of the dividend prior to performing the divide operation. So, for example, in one embodiment, an arithmetic unit may be configured to identify sign bits by beginning with the most significant bit of the dividend 200 (i.e. the most significant bit of byte 3.3) and traversing the dividend toward the right in search of a bit transition. If the dividend is a positive value with a sign bit of "0", then a search for the first "1" bit us undertaken. Alternatively, if the dividend is a negative number with a sign bit of "1", then a search for the first "0" is undertaken. In one embodiment, rather than searching for either the first "1" or "0" bit, the process merely involves searching for the first transition from bits matching the most significant bit to a different bit. For example, a two input XOR operation could be used in which the first input is the most significant bit of the dividend, and the second input is a sequence of lesser significant bits of the dividend. When an output of the XOR operation is asserted, a transition has been identified.

Given the above approach which searches for a first transition, a maximum of 127 compares may need to be performed in order to identify a transition. In order to reduce the time required to identify the transition, in one embodiment each of the sixteen blocks are examined in parallel. In such an embodiment, the hardware may scan each of the 16 blocks in parallel to determine which block is qualified for shifting out of the dividend. Shifting bits out of the dividend may generally be referred to as "prescaling" herein. A block may be considered qualified for prescaling if either of the following is true:

(i) all bits within the block are zeroes and the dividend is a signed positive integer or an unsigned integer;
(ii) all bits within the block are ones and the dividend is a signed negative number.

Given the above definition for a qualified block, a qualified group may be defined as a group in which all of its blocks are qualified. In one embodiment, dividend prescaling involves two steps. In the first step, an initial dividend prescale is performed. In a second step, the initially prescaled dividend is adjusted based on the normalization that was performed on the divisor. In one embodiment, normalization of the divisor generally entails shifting sign bits out of the divisor. Numerous techniques may be utilized for normalizing the divisor, including techniques similar to dividend prescaling in which a scan of the bits for a first bit transition is performed. Examples of divisor normalization will be discussed further below.

Figure 3:
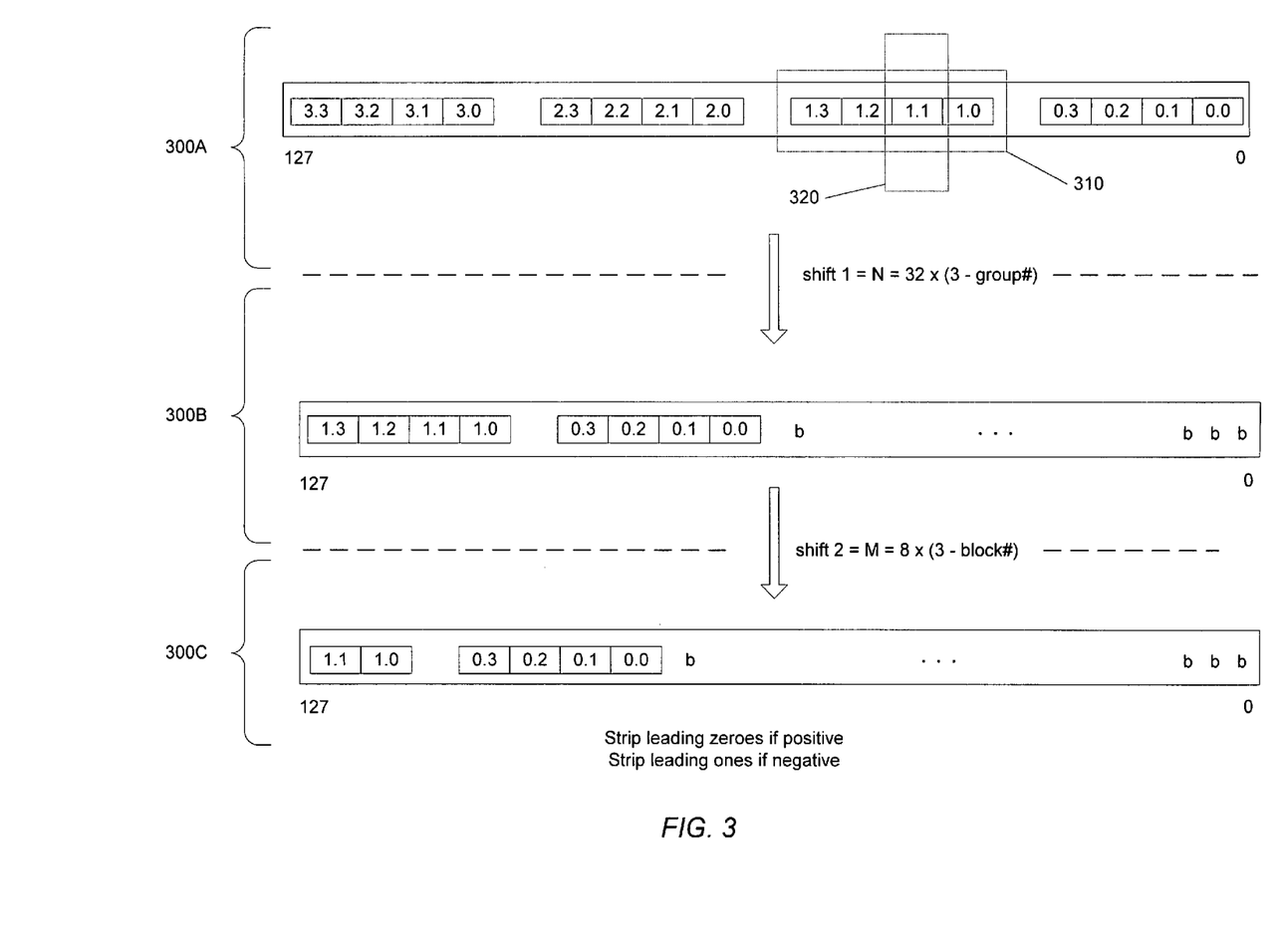
FIG. 3 depicts one embodiment of the prescaling of a dividend.

Turning now to FIG. 3, one embodiment of the prescaling of a dividend is described. As mentioned above, dividend prescaling may involve a two step process. In the first step, an initial prescale of the dividend is performed. In one embodiment, this first step may include two stages. Generally speaking, the first stage is directed to identification of a target group, and the second stage is directed to the identification of a target block. In the example of FIG. 3, an initial dividend 300A is shown, the dividend after the first stage of processing is shown 300B, and the dividend after the second stage of processing is shown 300C.

In the embodiment shown, the dividend includes 128 bits partitioned into four groups of four blocks each. Each of the blocks includes eight bits. Other embodiments may include a dividend with a different number of bits, and may include partitioning into other than four blocks. During a first stage of processing, the process involves identifying the "target group." The target group may be defined as the first group from the left of the dividend that is not qualified for prescaling. The dividend is then shifted left so that the target group occupies the most significant group position within the dividend. In the example shown, assume the first bit transition is identified as occurring within block 1.1. Group 1 (i.e., blocks 1.3-1.0) is then the target group 310. The dividend is then shifted from its position 300A to that of 300B. As seen, group 1 now occupies the leftmost position of the dividend. Bit positions to the right which have been shifted into the dividend will generally be ignored and may be any value. As each group includes 32 bits in this example, the shift count to move group 1 to the leftmost position may be represented as N=32×(3−group #)=32×(3−1)=64 bits.

Having performed the first stage of the first step, the second stage is then performed. In the second stage, the process involves locating the target block and shifting the dividend to the left so that the target block (i.e., the block which includes the bit transition) occupies the leftmost position of the dividend. In this example, the target block is block 1.1 320. Therefore, the dividend value 300B is shifted to the state depicted by dividend 300C. In this example, the shift count for the second stage may be calculated as M=8×(3−block #)=8×(3-1)=16 bits. Therefore, the total shift depicted in FIG. 3 is N+M=64+16=80 bits.

In this manner, all blocks of the dividend which include only sign bits may be rapidly identified and shifted out of the dividend. If a division operation includes a single cycle for each bit of the dividend, the number of cycles to perform the division operation is reduced by the number of bits shifted out of the dividend. In this case the number of cycles is reduced from 128 to (128−80)=48 cycles. It is to be understood that while the description utilizes little endian based examples, the methods and mechanisms described herein may be adapted for use in big endian systems as well. As bits may be shifted out of the dividend on a block basis, rather than a bit basis, the prescaling operation may not be precise in the sense the not all sign bits may actually be shifted out.

As discussed above, various implementations of a divisor may handle multiple bits of the dividend at a time. Consequently, it may be desirable to make certain adjustments to the prescaling operation in order to account for the way the bits are actually handled. In one embodiment, a divider is configured to examine three bits of the dividend at a time. Based on such an implementation, adjustments to the prescaling may be made as described in the following.

Figure 4:
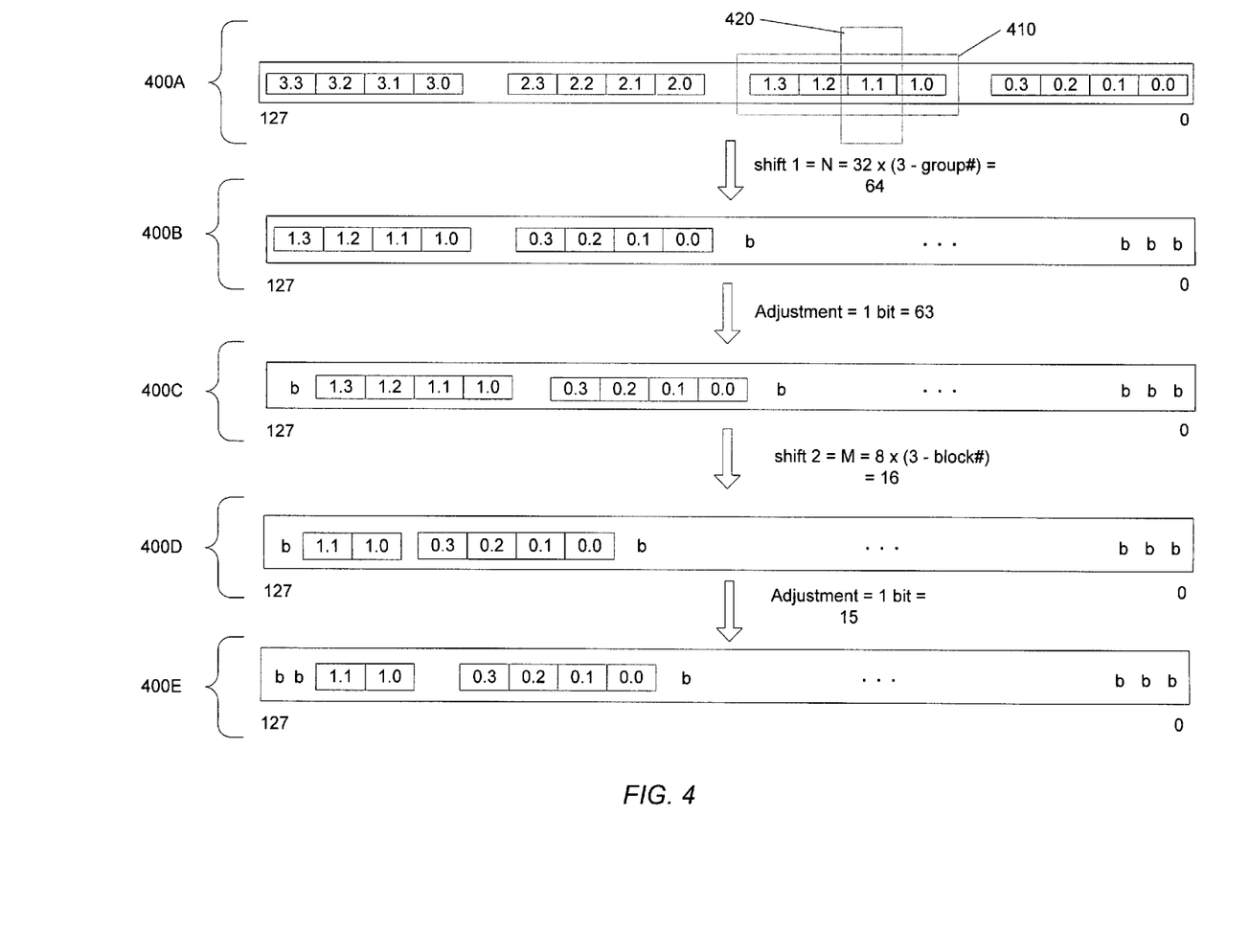
FIG. 4 depicts one embodiment of the prescaling of a dividend.

FIG. 4 illustrates an embodiment wherein adjustments to the prescaling of the dividend have been made to account for a divider which examines three bits of the dividend at a time. FIG. 4 is similar to FIG. 3 in that an initial dividend 400A is depicted, followed by different stages of the dividend during a prescaling process. It is to be understood that while each of the figures included herein may depict a dividend as being shifted in one direction or another during a prescaling process, actual shifting of the dividend may be delayed until a final shift value has been calculated. In such a case, shifting of the dividend is performed at once, rather than in stages.

As with FIG. 3, dividend 400A in FIG. 4 includes 128 bits with an identified target group 410 and target block 420. As before, the target group 410 is shifted to the leftmost position of the dividend 400B. Consequently, the shift count from dividend 400A to dividend 400B is 64 bits. However, in this embodiment, the shift count is adjusted so that it is the nearest lower multiple of three (i.e., the number of bits examined by the divider at a time). Therefore, instead of 64 bits, the shift count is adjusted downward to 63 bits which is a multiple of three. Shifting upwards is not generally chosen as significant bits may be lost. However, embodiments are possible which shift upwards if such a shift is possible without losing significant bits. Then in the second stage, as before, the target block is shifted so that it occupies the leftmost position of the dividend as illustrated by dividend 400D. Thus, the shift count here is 8+8=16 as depicted in 400D. Finally, this shift count of 16 is adjusted to be a multiple of 3 as well. Therefore, the shift count of 16 becomes 15 as shown in dividend 400E. Thus FIG. 4 illustrates step 1 of the dividend prescaling process. Table 1 below shows the effective shift count for a given target group and target block for an embodiment wherein the divider examines three bits at a time. Also shown is the (non-adjusted) shift count for the case depicted by FIG. 3.

TABLE 1

| Target group-block | Effective shift count | Non-adjusted shift count |
|---|---|---|
| group3-block3 | 0 | 0 |
| group3-block2 | 6 | 8 |
| group3-block1 | 15 | 16 |
| group3-block0 | 24 | 24 |
| group2-block3 | 30 | 32 |
| group2-block2 | 30 + 6 = 36 | 40 |
| group2-block1 | 30 + 15 = 45 | 48 |
| group2-block0 | 30 + 24 = 54 | 56 |
| group1-block3 | 63 | 64 |
| group1-block2 | 63 + 6 = 69 | 72 |
| group1-block1 | 63 + 15 = 78 | 80 |
| groupi-block0 | 63 + 24 = 87 | 88 |
| group0-block3 | 96 | 96 |
| group0-block2 | 96 + 6 = 102 | 104 |
| group0-block1 | 96 + 15 = 111 | 112 |
| group0-block0 | 96 + 24 = 120 | 120 |

Figure 5:
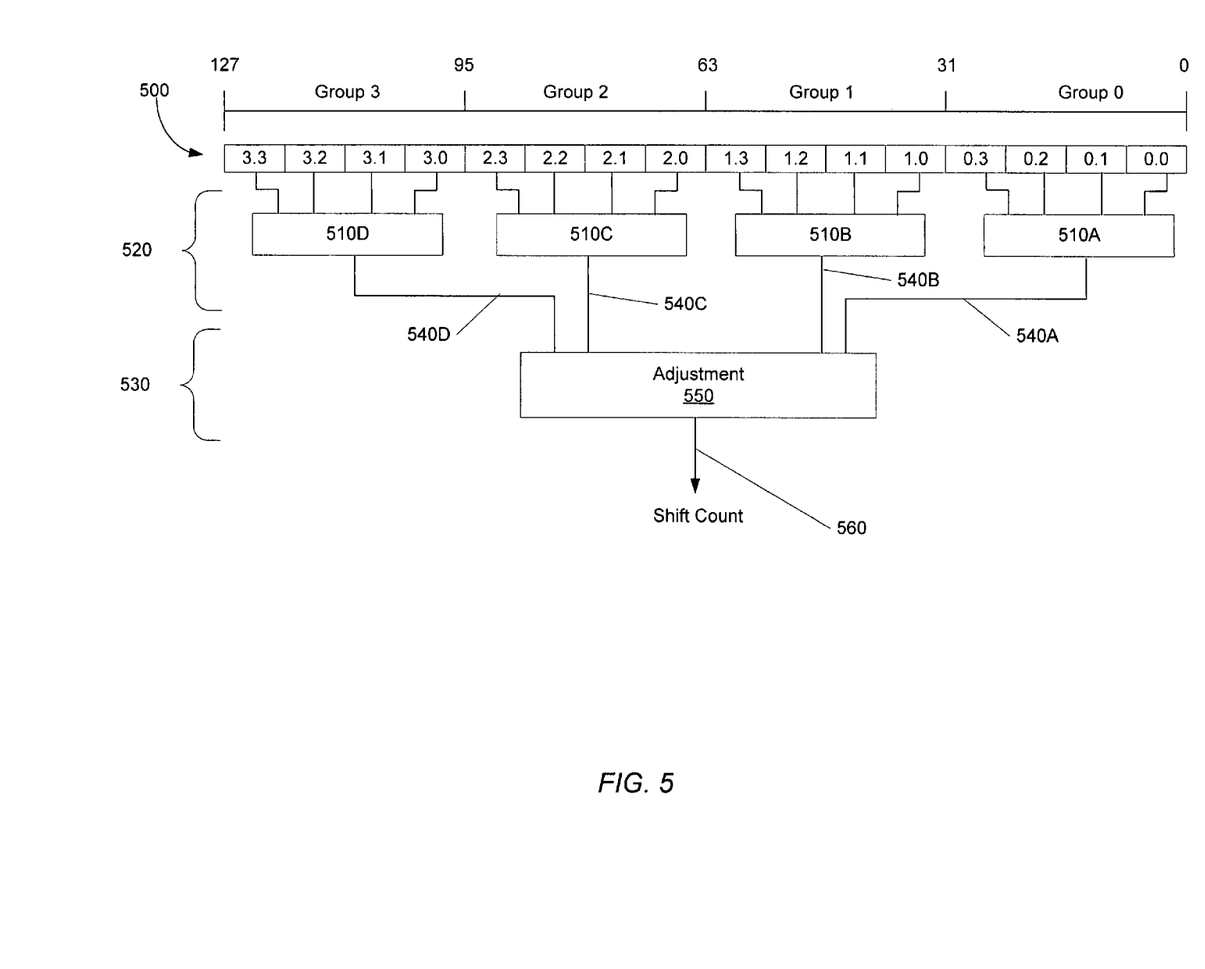
FIG. 5 illustrates one embodiment of a prescaling apparatus.

FIG. 5 illustrates one embodiment of an apparatus configured to perform the above described two-stage process (i.e., step 1) of prescaling. In the example shown, a 128 bit dividend 500 is shown to be partitioned into four groups of four blocks each. Each of the blocks is coupled to a unit 510A-510D which is configured to examine (e.g., scan) bits of the blocks in order to distinguish sign bits from non-sign bits. In one embodiment, units 510 are configured to scan bits of each of the blocks to identify a first transition as described above. In the example shown, each of the units 510A-510D is coupled to each of the blocks of a particular group. Unit 510A is coupled to group 0 blocks 0.0-0.3, unit 510B is coupled to group 1 blocks 1.0-1.3, unit 510C is coupled to group 2 blocks 2.0-2.3, and unit 510D blocks are coupled to group 3 blocks 3.0-3.3.

In one embodiment, each of the units 510 is configured to examine each of a group's blocks in parallel. Therefore, unit 510A is configured to examine each of blocks 0.0-0.3 concurrently. Each unit 510 then identifies the first bit transition from the left for the group of blocks which it is examining. Each of units 510A-510D further conveys a signal, 540A-540D, respectively, indicating a transition has been detected and the block in which it was detected. A unit 510 which does not detect a transition provides a signal indicating no transition was detected. Subsequent to receiving an indication from each of the units 510, unit 550 determines the leftmost unit 510 which has asserted a signal 540 indicating a transition was found. In this manner, the target group as described above may be identified. In addition, a given unit 510 also indicates a block in which the transition was found. In response to receiving an indication as to a particular block in which transition was found, unit 550 may then identify the target block as described above. For example, if block 2.1 is identified as the particular block wherein a transition was found, unit 500 may then determine that block 2.1 is the target block. Having identified both the target group and target block, unit 500 may then determine shift counts for the dividend as described above. Such shift counts may be adjusted as well, for example according to Table 1. In one embodiment, as in the embodiment of FIG. 5, examining the bits for transitions is performed on sub-blocks of the dividend, rather than the entire dividend at once. In this manner, the logic may be simplified.

After completion of step 1 of the prescaling process described above, a second step is performed in which shifting of the dividend may be further adjusted depending upon the normalization of the divisor. As mentioned above, the divisor may be normalized by shifting out all of the sign bits. However, given that both the dividend and divisor may be shifted prior to a divide operation, maintaining a proper significance relationship between the dividend and divisor is important. For example, assume a simple case in which the binary value "0100" is to be divided by "0010". The most significant bit of the dividend is one bit position greater than the most significant bit of the divisor. If both of the dividend and divisor are left shifted to eliminate the leading zeroes, the result is, in effect "100-" divided by "10--", where -- indicates a don't care. As can be seen, each of the dividend and divisor now have a most significant bit which is equivalent in value. Consequently, keeping track of the significance relationship, and perhaps making adjustments in the shift counts, may be necessary.

In an embodiment where three bits of a dividend are examined at a time, Table 2 below may be used to further adjust the dividend.

TABLE 2

| Normalization Amount norm_cnt | Shift Dividend Right |
|---|---|
| 0, 3, 6, . . . 60, 63 | 3 |
| 1, 4, 7, . . . 61, 64 | 2 |
| 2, 5, 8, . . . 62, 65 | 1 |

In the table above, norm_cnt indicates the shift count used to initially normalize the divisor. So, for example, a 64 bit positive integer value of two will initially be normalized by left shifting 62 bits. Consequently, the divisor will include 64−62=2 significant bits. In this example, the norm_cnt is 62 which corresponds to the third row of Table 2. The second column of Table 2 indicates a value by which the dividend (resulting from step 1) is to be shifted to the right. In this example, a norm_cnt of 62 indicates the dividend is to be shifted to the right by a count of 1. Consequently, the normalization amount, norm_cnt, may be used to adjust the dividend to maintain the significance relationship between the dividend and divisor. More generally, in an embodiment wherein a divider examines three bits of the dividend at a time, the value in the second column may be obtained from the formula Shift Dividend Right=3−(N MOD 3), where MOD represents the modulus function and N is the norm_cnt. In alternative embodiments, a divider may examine other than three bits at a time. If a divider is configured to examine X bits at a time, the values for the right column above may be obtained by the formula Shift Dividend Right=X−(N MOD X).

Figure 6:
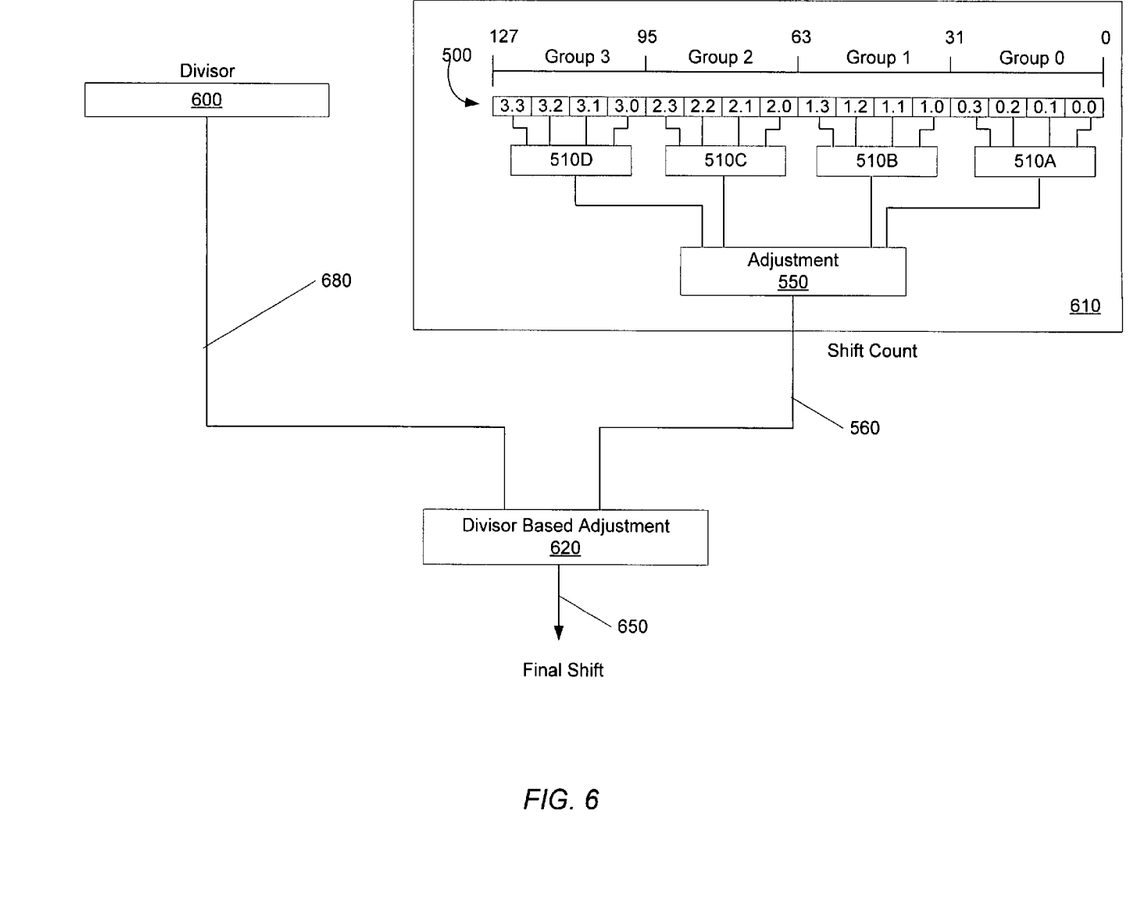
FIG. 6 illustrates one embodiment of a prescaling and adjustment apparatus.

FIG. 6 depicts one embodiment in which a further adjustment is made to the dividend based on Table 2 above. In the example shown, an apparatus 610 generally corresponding to that of FIG. 5 is shown with similar items numbered as in FIG. 5. Also shown is a divisor unit 600 configured to perform normalization of the divisor and convey an indication 680 as to the shift count (norm_cnt) used to perform the divisor normalization. An adjustment unit 620 then receives the shift count 560 and norm_cnt 680 and may adjust the dividend as indicated by Table 2. Indication 650 may generally represent the final shift count for prescaling the dividend.

In one embodiment, the divider mechanism is also configured to detect divide by zero and overflow conditions prior to performing the division. In the embodiment of FIG. 6, unit 600 may also convey an indication as part of, or separate from, signal 680 which indicates the divisor is zero. For example, in one embodiment, the divisor unit 600 may be configured to examine the bits of the divisor to locate a first bit transition—similar to the process described in FIG. 5 for the dividend. The divisor unit 600 may utilize the block based approach described in FIG. 5, or may utilize a single logic block to identify the bit transition. If no bit transition is detected, divisor unit 600 may convey a corresponding indication to unit 620 and/or other units of the divider and/or processing system. Responsive to such an indication, the divide operation may be aborted and divide by zero condition indicated as appropriate.

In addition to detecting divide by zero conditions, the divider may also be configured to detect overflow conditions wherein a quotient is too large to fit in a register. As with the divide by zero detection, the overflow detection may also detect such a condition prior to actually completing the divide operation. In one embodiment, unit 620 may be configured to examine the operands to determine whether a quotient overflow will occur should the division operation be completed. As noted above, a quotient overflow occurs if the quotient is too large to fit in its intended register. In one embodiment, the register size for storing the quotient is 64 bits. Therefore, if the resulting quotient is greater than 64 bits, an overflow has occurred. Generally speaking, overflow detection is performed when the division operation is performed. However, in one embodiment, overflow detection is performed by examining the operands which are to be used in the division operation.

Generally speaking, an overflow may be detected if (i) the divisor is equal to "1", and (ii) the number of significant bits in the dividend exceeds the size of the quotient register. A divisor equal to "1" may be indicated by a divisor normalization count of N−1, where N is equal to the number of bits in the divisor. Therefore, if the divisor includes 64 bits, a shift count of 63 would indicate that the divisor has a value of "1". If the number of significant bits in the dividend is greater than a size of the destination quotient register, then a divide by "1" will result in an overflow. In the example shown, if the most significant bit of the dividend is in either group 3 or group 2 (as shown in FIGS. 5 and 6), then the divide operation will result in an overflow. In response to detecting an overflow condition, an appropriate signal may be generated and the division operation may be aborted.

Further, an overflow condition may generally be detected if the dividend prescale count minus the divisor normalization count is greater than the size of quotient register. In one embodiment, due to imprecision in dividend prescaling, the dividend prescale count may be smaller than the actual number of leading zeroes/ones in the dividend. Accordingly, an overflow condition may be detected when:

(dividend prescale count−divisor normalization count)> (size of quotient register+number of leading zeroes/ones in the dividend after prescaling).

Figure 7:
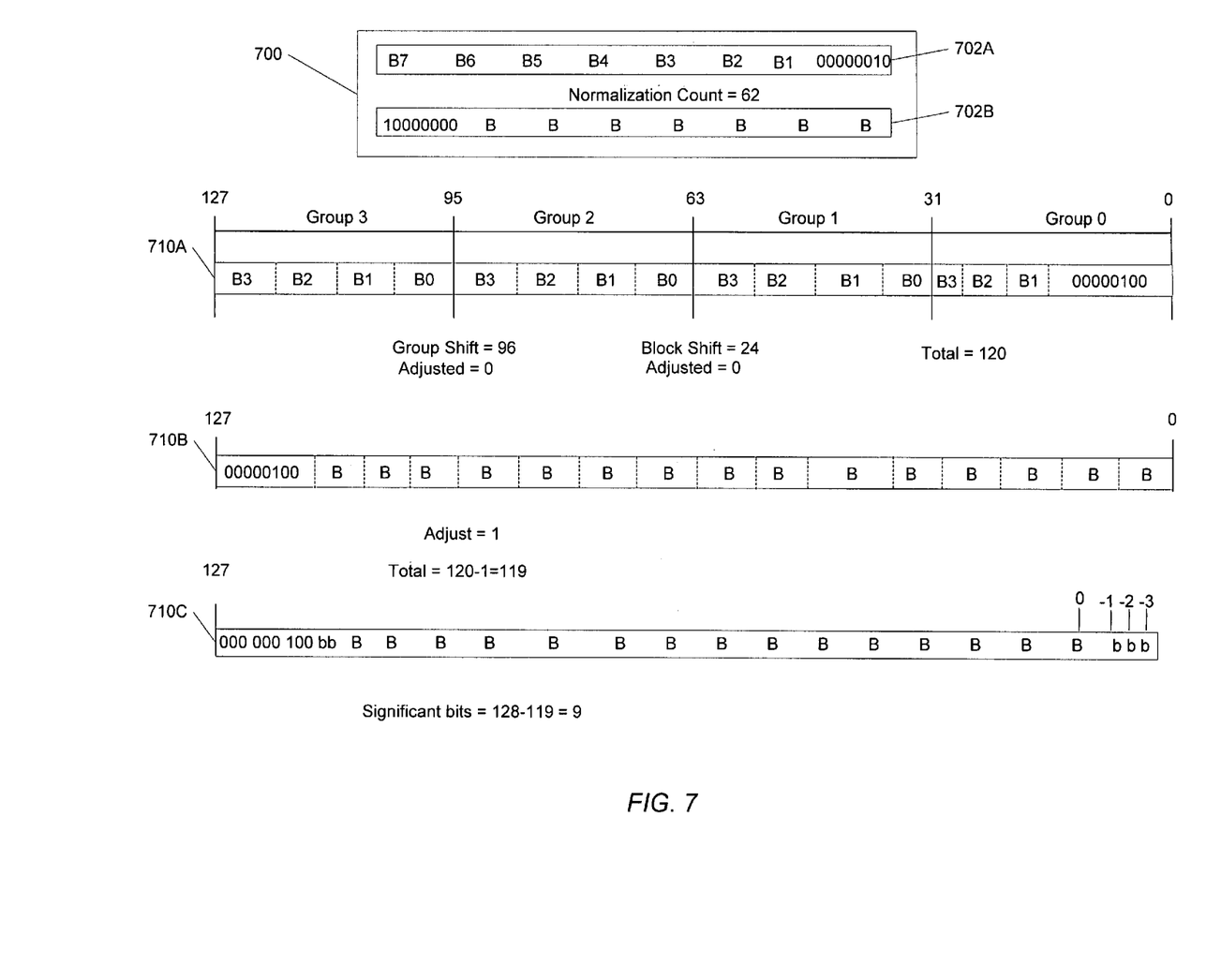
FIG. 7 depicts one embodiment of normalized divisor and prescaled dividend.

Turning now to FIG. 7, one embodiment of a method and mechanism as described above is illustrated. For purposes of discussion, a divider which examines three bits of a divided at a time is illustrated. In the example shown, normalization of a divisor is depicted in block 700. In this example, the original divisor 702A includes 64 bits (eight bytes) and is the binary representation of the value for two. The original dividend 710A includes 128 bits and is shown to have an original value of four. Therefore, an operation of 4÷2 is to be performed. Normalization of the divisor involves left shifting the original dividend 702A by 62 bits to remove the sign bits and generate the normalized divisor 702B. Therefore, norm_cnt in this example is 62.

Prescaling of the dividend 710A proceeds as described above by identifying the target group. In this case, the target group (the first group from the left not qualified for prescaling) is group 0. Therefore, an initial left shift count of 96 (i.e., groups 1, 2 and 3) is determined. As 96 is divisible by 3, no adjustment to the initial count is needed to arrive at a count value divisible by three. Therefore, the dividend is to be shifted left 96 bits. In addition, the target block is identified (i.e., the first block from the left of group 0 which is not qualified for prescaling). The target block in this case is the least significant block of group 0. Therefore, a block shift count of 24 (3 blocks of 8 bits each) is determined. As this value, 24, is divisible by 3, no adjustment to the count value is required. Therefore, the first step of the prescaling operation includes a shift count of 96+24=120. Dividend 710B represents the original dividend 710A left shifted by 120 bits.

The second step of the prescaling operation involves an adjustment to the dividend based on the normalization of the divisor in order to maintain the significance relationship between the divisor and dividend. In this case, the divisor has a norm_cnt of 62. Therefore, referencing Table 2 above it is determined that the dividend is to be right shifted by 1 which is depicted by dividend 710C. Consequently, the final shift count for the dividend is 120−1=119. As the original dividend was a 128 bit value, a shift of 119 leaves only 9 significant bits of the dividend. Accordingly, in an embodiment in which the divider examines three bits of the dividend per iteration, 9÷3=3 iterations may be required to perform the divide operation.

Figure 8:
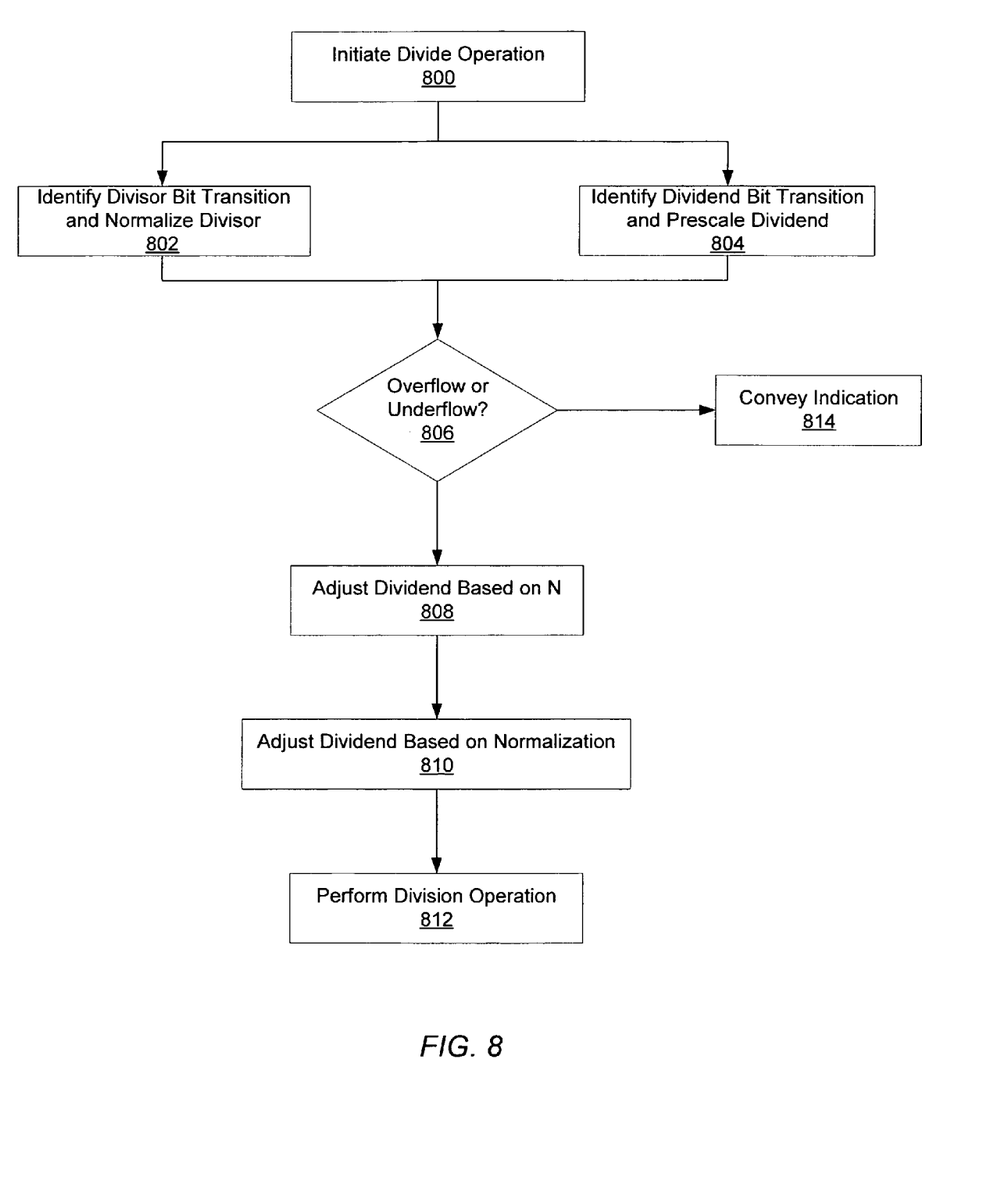
FIG. 8 illustrates one embodiment of a method for performing division.

FIG. 8 illustrates one embodiment of a method for performing a division operation. Block 800 indicates the initiation of a divide operation. At such time, both the divisor and dividend may be loaded as operands. Subsequently, the divisor is examined (block 802) to identify its sign bits. If it is determined that the divisor equals zero, further examination of the divisor may be bypassed and a divide by zero indication may be conveyed. If the divisor is not equal to zero, the sign bits may be identified by searching the most significant bits for a first bit transition from zero to one, or vice-versa. Upon identifying the sign bits, the divisor may be normalized by shifting all sign bits out of the divisor as described above. In addition to normalizing the divisor, the dividend is examined (block 804). Examination of the dividend may be performed concurrent with examination of the divisor, though not necessarily.

Examination of the dividend may also entail scanning bits of the dividend to identify its sign bits. While a single logic block could be utilized to examine all bits of the dividend, the dividend may be partitioned and examined as sub-blocks in accordance with the above description. Subsequent to identifying blocks and sub-blocks of sign bits, the dividend may be prescaled by shifting an integral number of sub-blocks from the dividend. In various embodiments, the divider may be configured to examine multiple bits N of the dividend at a time during the division operation. Accordingly, it may be desirable to maintain the dividend as having a number of bits equal to a multiple of N. Therefore, after the initial prescaling of the dividend, the prescaling may be adjusted (block 806) based on the value N such that the number of bits remaining in the dividend is a multiple of N. It is noted that at any time after the significant bits of both the divisor and/or the dividend have been determined, an overflow or underflow may be detected (decision block 806) and a corresponding indication (block 814) conveyed as appropriate.

Assuming no overflow or underflow condition, the dividend may be further adjusted (block 810) based upon the normalization of the divisor. The appropriate adjustment may be determined as described above in relation to Table 2. Finally, having adjusted the dividend if necessary, both the divisor and dividend are in condition for the final dividend operation (block 812). It is to be understood that the operations and blocks depicted in FIG. 8 need not be performed in the order depicted. Other embodiments may change the order of various operations and may perform certain operations concurrently.

Figure 9:
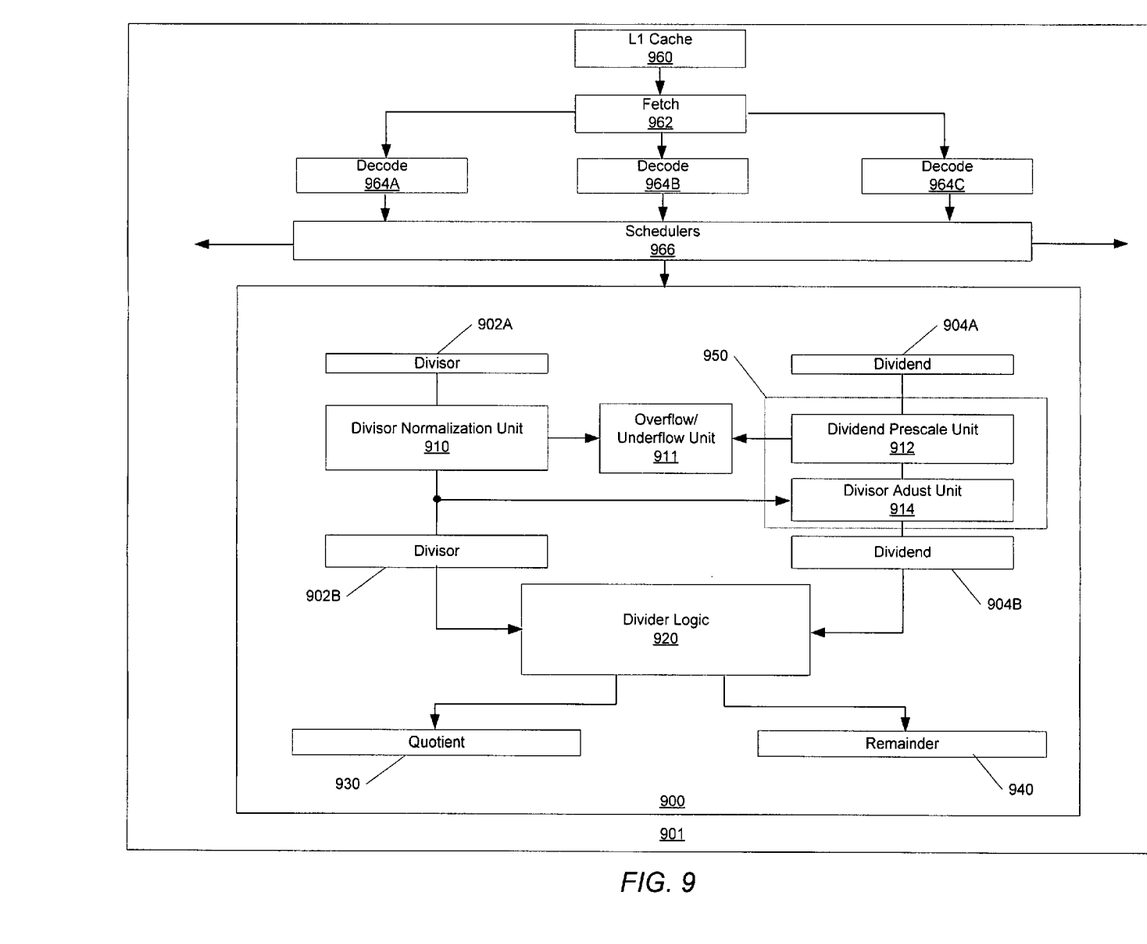
FIG. 9 depicts one embodiment of a processor including a divider.

FIG. 9 is a block diagram illustrating an overview one embodiment of a processor 901 including a divider unit 900 configured to operate in accordance with the above description. In the example shown, processor 901 includes a cache 960, fetch unit 962, decode units 964A-964C, and schedulers 966. Generally speaking, fetch unit 962 may fetch instructions from cache 960 and convey retrieved instructions to one or more of decoder units 964. Decode units 964 may then decode instructions and convey them to a scheduler(s) 966. Instructions destined for the divider 900 may be conveyed from the scheduler(s) 966 to the divider.

In the example shown, a divisor 902A and dividend 904A register are depicted which are configured to store the original divisor and dividend operands. A divisor normalization unit 910 receives an modifies the divisor 902A. Divisor normalization unit 910 is coupled to convey an overflow/underflow indication to an overflow/underflow unit 911 in response to detecting such a condition. In addition, the normalization unit 910 is coupled to convey the normalized divisor to a normalized divisor register 902B. It is noted that while separate registers are shown for storing the original divisor 902A and normalized divisor 902B, the same register may in fact be used.

In addition to the above, a dividend processing unit 950 is shown which includes a dividend prescale unit 912 coupled to receive the original dividend 904A and perform a prescale operation on the dividend. The dividend prescale unit 912 may include logic to partition the dividend into blocks and sub-blocks as described above. The dividend prescale unit 912 is coupled to convey an overflow/underflow indication to the overflow/underflow unit 911 as appropriate. As described above, the dividend prescale unit 912 may be configured to shift sign bits from the dividend. Further, depending upon the configuration of the divider 900 and a number of bits it examines at a time, the prescale unit 912 may also adjust the initial prescaling such that a number of bits X remaining in the dividend after prescaling is a multiple of X. A divisor adjustment unit 914 is coupled to receive the prescaled dividend from the prescale unit 912, and an indication from the divisor normalization unit 910 as to the normalization of the divisor. Based upon the normalization of the divisor, the adjustment unit 914 may adjust the dividend by shifting it one or more bits to the right as described above in Table 2. The result may then be conveyed to dividend register 904B. Similar to that described above, register 904B may in fact be the same register as 904A. Utilizing divisor 902B and dividend 904B, divider logic 920 may then perform the division operation to produce a quotient 930 and remainder 940.

Various embodiments may further include receiving, sending or storing instructions and/or data that implement the above described functionality in accordance with the foregoing description upon a computer readable medium. Generally speaking, a computer readable medium may include storage media or memory media such as magnetic or optical media, e.g., disk or CD-ROM, volatile or non-volatile media such as RAM (e.g., SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for performing division comprising:
   receiving an original divisor and an original dividend, wherein bits of the original divisor and the original dividend have a first significance relationship;
   normalizing the original divisor by removing sign bits to produce a normalized divisor;
   prescaling the original dividend by removing sign bits to produce a prescaled dividend;
   producing an adjusted dividend by adjusting the prescaled dividend so that bits of the normalized divisor and the adjusted dividend maintain the first significance relationship; and dividing in a dividend processing unit the adjusted dividend by the normalized divisor.

2. The method as recited in claim 1, wherein normalizing the divisor comprises:
examining most significant bits of the original divisor to identify a first bit transition from a bit of a first value to a bit of a different value; and
removing from consideration bits of the first value up to the transition.

3. The method as recited in claim 2, wherein prescaling the dividend comprises:
partitioning the original dividend into two or more groups of bits;
concurrently examining each of the groups of bits to identify a second bit transition; and
removing from consideration most significant groups of bits of the original dividend in which no bit transition is detected.

4. The method as recited in claim 3, wherein prescaling the dividend further comprises:
partitioning each of said groups of bits into two or more blocks of bits;
identifying a block of said blocks in which second bit transition occurs; and
removing from consideration most significant blocks of said blocks of the original dividend in which no bit transition is detected.

5. The method as recited in claim 4, wherein in dividing the adjusted dividend by the normalized divisor, X number of bits of the adjusted dividend are considered at a time, and wherein prescaling the dividend comprises restoring a first number of bits of the original dividend for consideration such that a number of bits of the adjusted dividend is a multiple of the value X.

6. The method as recited in claim 5, wherein prescaling the dividend further comprises restoring for consideration a second number of bits of the original dividend responsive to a number of bits N of the original divisor removed from consideration.

7. The method as recited in claim 6, wherein the second number of bits of the original dividend which are restored for consideration is equal to a value determined by the formula X−(N MOD X).

8. A divider comprising:
a divisor normalization unit configured to receive an original divisor;
a dividend processing unit configured to receive an original dividend; and
divider logic;
wherein bits of the original divisor and the original dividend have a first significance relationship;
wherein the divisor normalization unit is configured to normalize the original divisor by removing sign bits to produce a normalized divisor;
wherein the dividend processing unit is configured to:
prescale the original dividend by removing sign bits to produce a prescaled dividend; and
produce an adjusted dividend by adjusting the prescaled dividend so that bits of the normalized divisor and the adjusted dividend maintain the first significance relationship;
wherein the divider logic is configured to divide the adjusted dividend by the normalized divisor.

9. The divider as recited in claim 8, wherein the normalization unit is configured to:
examine most significant bits of the original divisor to identify a first bit transition from a bit of a first value to a bit of a different value; and
remove from consideration bits of the first value up to the transition.

10. The divider as recited in claim 9, wherein the dividend processing unit is configured to:
partition the original dividend into two or more groups of bits;
concurrently examine each of the groups of bits to identify a second bit transition; and
remove from consideration most significant groups of bits of the original dividend in which no bit transition is detected.

11. The divider as recited in claim 10, wherein the dividend processing unit is further configured to:
partition each of said groups of bits into two or more blocks of bits;
identify a block of said blocks in which second bit transition occurs; and
remove from consideration most significant blocks of said blocks of the original dividend in which no bit transition is detected.

12. The divider as recited in claim 11, wherein the divider logic is configured to consider X number of bits of the adjusted dividend at a time, and wherein the dividend processing unit is configured to restore a first number of bits of the original dividend for consideration such that a number of bits of the adjusted dividend is a multiple of the value X.

13. The divider as recited in claim 12, wherein the dividend processing unit is configured to restore for consideration a second number of bits of the original dividend responsive to a number of bits N of the original divisor removed from consideration.

14. The divider as recited in claim 13, wherein the second number of bits of the original dividend which are restored for consideration is equal to a value determined by the formula X−(N MOD X).

15. A processor comprising:
a cache;
an instruction decode unit coupled to receive instructions from the cache; and
a divider unit, wherein the divider unit is configured to:
receive an original divisor and an original dividend, wherein bits of the original divisor and the original dividend have a first significance relationship;
normalize the original divisor by removing sign bits to produce a normalized divisor;
prescale the original dividend by removing sign bits to produce a prescaled dividend; and
produce an adjusted dividend by adjusting the prescaled dividend so that bits of the normalized divisor and the adjusted dividend maintain the first significance relationship; and
divide the adjusted dividend by the normalized divisor.

16. The processor as recited in claim 15, wherein the divider unit is configured to normalize the original divisor by:
examining most significant bits of the original divisor to identify a first bit transition from a bit of a first value to a bit of a different value; and
removing from consideration bits of the first value up to the transition.

17. The processor as recited in claim 16, wherein the divider unit is configured to:
partition the original dividend into two or more groups of bits;

concurrently examine each of the groups of bits to identify a second bit transition; and remove from consideration most significant groups of bits of the original dividend in which no bit transition is detected.

18. The processor as recited in claim 17, wherein the divider unit is configured to consider X number of bits of the adjusted dividend at a time when dividing the adjusted dividend by the normalized divisor, and wherein the divider unit is configured to restore a first number of bits of the original dividend for consideration such that a number of bits of the adjusted dividend is a multiple of the value X.

19. The processor as recited in claim 18, wherein the divider unit is configured to restore for consideration a second number of bits of the original dividend responsive to a number of bits N of the original divisor removed from consideration.

20. The processor as recited in claim 19, wherein the second number of bits of the original dividend which are restored for consideration is equal to a value determined by the formula X−(N MOD X).

* * * * *